US012789474B2

(12) United States Patent
Unger et al.

(10) Patent No.: US 12,789,474 B2
(45) Date of Patent: Nov. 10, 2026

(54) METHOD FOR PRODUCING AN ELECTRICALLY CONDUCTIVE CONNECTION

(71) Applicant: Hesse GmbH, Paderborn (DE)

(72) Inventors: Andreas Unger, Verl (DE); Michael Broekelmann, Delbrueck (DE); Matthias Hunstig, Paderborn (DE); Hans-Juergen Hesse, Paderborn (DE)

(73) Assignee: Hesse GmbH, Paderborn (DE)

( * ) Notice: Subject to any disclaimer, the term of this patent is extended or adjusted under 35 U.S.C. 154(b) by 271 days.

(21) Appl. No.: 17/691,830

(22) Filed: Mar. 10, 2022

(65) Prior Publication Data

US 2022/0194014 A1 Jun. 23, 2022

Related U.S. Application Data

(63) Continuation of application No. PCT/DE2020/100783, filed on Sep. 8, 2020.

(30) Foreign Application Priority Data

Sep. 11, 2019 (DE) ..................... 10 2019 124 333.5

(51) Int. Cl.
*B29C 65/08* (2006.01)
*H01R 43/02* (2006.01)

(52) U.S. Cl.
CPC ......... *B29C 65/08* (2013.01); *H01R 43/0221* (2013.01)

(58) Field of Classification Search
CPC ...... B29C 65/08; H01R 43/0221; B23K 20/10
See application file for complete search history.

(56) References Cited

U.S. PATENT DOCUMENTS 3,891,822 A * 6/1975 Laub ........................ H01L 24/85 257/E21.519
4,534,811 A * 8/1985 Ainslie ................ B23K 20/023 219/56.22

(Continued)

FOREIGN PATENT DOCUMENTS

DE 102018121696 A1 3/2020
EP 0367705 A2 * 5/1990
JP 2002118152 A 4/2002

OTHER PUBLICATIONS

International Search Report dated Jan. 26, 2021 in corresponding application PCT/DE2020/100783.

(Continued)

*Primary Examiner* — Daniel Mcnally
(74) *Attorney, Agent, or Firm* — Muncy, Geissler, Olds & Lowe, P.C.

(57) ABSTRACT

A method for producing an electrically conductive connection between a contact surface of a functional component and a connection component. The connection component is pressed against the contact surface of the functional component with a normal force using a bonding tool. The bonding tool and the connection component are brought in contact with same to vibrate ultrasonically. A laser beam is generated by a laser generator and directed onto the bonding tool, and preferably onto a tip of the bonding tool, whereby the tip of the bonding tool is heated. An actual temperature of the tip is contactlessly measured and the laser generator is operated intermittently and/or with an adjustable laser output such that a predefined target temperature is adjusted at the tip of the bonding tool.

13 Claims, 9 Drawing Sheets

(56) References Cited

U.S. PATENT DOCUMENTS

| | | | | |
|---|---|---|---|---|
| 2005/0176178 | A1* | 8/2005 | Takahashi | H01L 24/78 257/E21.504 |
| 2021/0194102 | A1 | 6/2021 | Broekelmann et al. | |

OTHER PUBLICATIONS

International Preliminary Report on Patentability dated Mar. 24, 2022 in corresponding application PCT/DE2020/100783.

* cited by examiner

METHOD FOR PRODUCING AN ELECTRICALLY CONDUCTIVE CONNECTION

This nonprovisional application is a continuation of International Application No. PCT/DE2020/100783, which was filed on Sep. 8, 2020, and which claims priority to German Patent Application No. 10 2019 124 333.5, which was filed in Germany on Sep. 11, 2019, and which are both herein incorporated by reference.

BACKGROUND OF THE INVENTION

Field of the Invention

The present invention relates to a method for laser-assisted ultrasonic bonding.

Description of the Background Art

From the applicant's post-published German patent application 10 2018 121 696.3, which corresponds to US 2021/0194102, which is incorporated herein by reference, it is known to heat a tip of a bonding tool during ultrasonic bonding by means of a laser beam. In this regard, various method concepts are disclosed with respect to the operation of a laser generator providing the laser beam. The disclosed process concepts are advantageous especially in a controlled operation.

SUMMARY OF THE INVENTION

It is therefore an object of the present invention to provide a further developed method for the laser-assisted production of a bond in which a temperature of the tool tip can be predefined, monitored, and/or adjusted as required.

Accordingly, the method for producing an electrically conductive connection between a contact surface of a functional component and a connection component comprises the following method steps: pressing the connection component against the tip of the bonding tool and against the contact surface of the functional component with a normal force using the bonding tool; causing the bonding tool and the connection component in contact with same to vibrate ultrasonically; activating a laser generator and providing a laser beam using the laser generator; directing the laser beam onto the tip of the bonding tool, and heating the tip of the bonding tool with said laser beam; contactlessly measuring an actual temperature of the tip of the bonding tool; operating the laser generator intermittently and/or with an adjustable laser output such that a predefined target temperature is adjusted at the tip of the bonding tool.

In particular, it can be provided in this regard that the laser generator is operated in a controlled manner and that the tool tip actual temperature detected by measurement is adapted or adjusted to the target temperature.

An advantage of the invention is that the actual temperature is determined and influenced directly at the tip of the bonding tool and that, indirectly, a temperature of the connection component to be connected to the functional component can thus also be selected and adjusted thereby as required. Variable or fluctuating process parameters that cannot be precisely determined either by measurement or by modeling can be compensated for hereby, which influence the actual temperature of the tool tip and thus affect the bonding process. For example, the actual temperature can be influenced by the surface properties or the absorption capacity of the bonding tool during heating with the laser beam as well as by the heat flow in the direction of a shaft of the bonding tool, the ultrasonic generator or ultrasonic transducer, and/or other functional components of the automatic bonding machine. Other possible influencing variables are, in particular, the time-variable wear on the bonding tool, the surface condition of the contact surface and of the connection component, and/or deviations in relation to the specified normal force, as well as the amplitudes and frequency of the ultrasonic vibration. Independent of the time-variable or unknown influence of these disturbance variables, the actual temperature of the tip of the bonding tool can be determined by the production method of the invention and controlled to the target temperature.

The actual temperature and the target temperature during bonding are usually above the ambient temperature or the initial temperature of the connection partners (functional component and connection component).

It is therefore possible in the method of the invention to influence the bonding process by changing the normal force, adjusting the ultrasonic vibrations, and adjusting or changing the temperature. Whereas the normal force in particular can only be adjusted or changed slowly, the temperature can be changed dynamically by activating or deactivating the laser generator and/or adjusting the laser output. The supplementary provision of laser output therefore expands the possibility of influencing the process, in addition of introducing energy into the connection point, and/or of adapting the process to different materials. In principle, the method of the invention can be used, for example, in the field of wire bonding and chip bonding.

Because the tip of the bonding tool is heated by means of the laser beam, the production process of the invention is also very gentle. There is no direct heating of the connection partner with the result that the risk of damage to the connection partner is counteracted. For example, the risk is reduced that during wire bonding the wire melts or its surface is damaged and the ultrasonic excitation is made more difficult. During chip bonding, indirect heating of the chip significantly reduces the risk of damage to the chip, fixed to the tool as a connection component, or its functional elements and/or connection contacts.

The laser generator can be activated and the laser beam can be provided before the bonding tool is subjected to the normal force and the connection component is pressed against the contact surface of the functional component, or before the bonding tool is excited to vibrate ultrasonically. Advantageously, this can significantly accelerate the bonding process and reduce the time for producing a bond, because the bonding tool is already warm when it is set up and less ultrasonic energy needs to be supplied. The reduced process times then have the result that more connections can be made per unit of time. In addition, the wear of the bonding tool can be reduced if the ultrasound is only activated when the connection partners are already heated and are thus softer. In addition, it can be achieved that the initial thermal conditions at the time of normal force application and/or when activating the ultrasound are always the same with the result that the reproducibility and controllability of the process improve.

For example, it can be provided that the bonding tool is mounted on a movable bonding head. The tip of the bonding tool can then be heated when positioning the bonding head over the contact surface of the functional component, with the result that the cycle time decreases overall and the connections can be produced particularly economically within a short time.

The laser output of the laser generator can be selected such that the bonding tool tip is permanently heated, wherein the actual temperature at the tip of the bonding tool after the production of a first electrically conductive connection and before the production of a second electrically conductive connection is continuously above the ambient or initial temperature. Advantageously, the process time can be further reduced and the throughput increased by the permanent heating of the tip of the bonding tool, with the result that a large number of electrically conductive connections can be produced particularly economically. Because the actual temperature is always above the ambient or initial temperature, the thermal energy introduced into the connection point with the aid of the laser beam can be lower when producing the second and each subsequent connection than when producing the first connection.

The laser generator can continue to be operated after the excitation of the bonding tool to vibrate ultrasonically has ended. Advantageously, the connection quality can be improved thereby.

The laser beam can be guided out of the laser generator via an optical waveguide and is guided to the tip of the bonding tool. Advantageously, in this case the laser generator can be installed in a fixed position, whereas the laser beam is guided via the optical waveguide to the consequently freely positionable bonding tool. This makes it possible to keep the moving masses low and to provide an automatic bonding machine characterized by high dynamics.

A free optical waveguide end, facing the tip of the bonding tool, can be positioned or held at a distance from the bonding tool. Advantageously, this achieves, on the one hand, that ultrasonic vibrations from the bonding tool are not transmitted to the optical waveguide. On the other hand, the distance between the tool tip and the free end of the optical waveguide counteracts contamination of the optical waveguide and thus a reduction in optical quality or optical efficiency.

The laser beam can be guided onto the bonding tool on the lateral surface from the outside. Advantageously, this makes the assembly and maintenance of the automatic bonding machine very easy. When changing tools, work on the laser generator or the optical waveguide can be avoided with the result that tools can be changed quickly and with little effort and downtimes are reduced.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
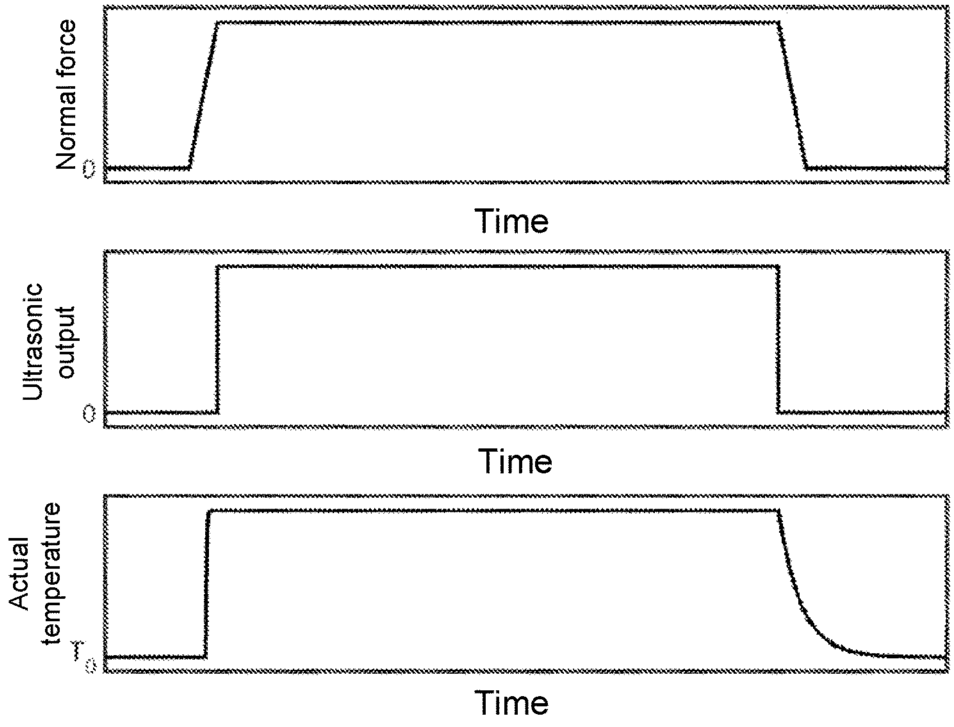
FIG. 1 shows a time profile of the process parameters: normal force, ultrasonic output, and actual temperature of a tip of a bonding tool, in a first variant of the operating method of the invention.

In the following, various process variants or concepts are used as examples to illustrate the possibility of influencing the bonding process in laser-assisted ultrasonic bonding by influencing the normal force, the ultrasonic output, and the target or actual temperature to which a tip of the bonding tool is to be heated or is heated.

For example, the method can be used in ultrasonic thick wire bonding. In this case, the bonding tool is held on a bonding head that can be freely positioned and rotated in a bonding region of an automatic bonding machine. The bonding tool is positioned over a contact surface of a functional component, for example, an electrical conductor on a circuit board, a chip, or a battery, by the positioning of the bonding head. A typically V-shaped recess, in which an aluminum or copper wire serving as a connection component is inserted, is provided on the bonding tool at the front side at the tip. The connection component is pressed against the contact surface of the functional component with a normal force by lowering the bonding tool. The bonding tool is then excited to vibrate ultrasonically by an ultrasonic generator, for example, a piezo actuator. In addition, the tip of the bonding tool is heated by a laser beam provided by a laser generator. For this purpose, the laser beam preferably strikes the bonding tool from the outside on the lateral surface in the region of the tip.

In order to be able to make as many electrically conductive connections as possible within a given time, the moving masses must be as low as possible, especially in ultrasonic wire bonding. In this respect, it can be provided that the laser generator is installed in a fixed position and the laser beam is guided through an optical waveguide out of the laser generator to the bonding tool. A free optical waveguide end, facing the tip of the bonding tool, can be positioned at a distance from the bonding tool. This prevents the transmission of the ultrasonic vibrations to the optical waveguide. In addition, contamination of the optical waveguide by detached material particles is counteracted during laser-assisted ultrasonic bonding, with the result that good optical efficiency is achieved.

In the region of the free end of the optical waveguide, the waveguide is attached to the bonding head and moved along with it. The optical waveguide or the free end thereof is thus always provided in a defined position relative to the bonding tool. The laser beam therefore always strikes the bonding tool at a defined, identical point. For example, a recess or pocket can be formed on the lateral surface of the bonding tool where the laser beam strikes the bonding tool. In the region of the recess or pocket, a surface geometry can be selected so that the laser beam is reflected repeatedly and strikes the bonding tool repeatedly. This improves the absorption of the laser beam with the result that a larger proportion of the laser output is available as heat output for heating the tip of the bonding tool.

Of course, the above illustration for ultrasonic thick wire bonding is merely exemplary. The same relationships apply analogously to other bonding processes, for example, ultrasonic thin wire bonding, chip bonding, or ribbon bonding.

A first implementation example for the method of the invention according to FIG. 1 provides that the process parameters: normal force, ultrasonic output, and actual temperature, are simultaneously brought to a constant process value. The process value of the actual temperature is above an ambient or initial temperature $T_0$. The process parameters are shown scaled or normalized.

The normal force according to FIG. 1 builds up when the bonding tool is lowered as soon as the connection component is pressed against the contact surface of the functional component. A linear increase of the normal force is selected as an example in the drawing. In reality, the force can also increase nonlinearly.

As soon as the normal force reaches the target value, the bonding tool is excited to vibrate ultrasonically. Accordingly, the ultrasound source is activated and the ultrasonic output is kept constant over the process time. The activation time for the laser generator is selected so that the process value of the actual temperature is reached as soon as the normal force reaches its maximum. The actual temperature is then kept constant over time as long as the normal force is applied and the bonding tool is excited to vibrate ultrasonically.

After the electrically conductive connection is produced, the ultrasound is deactivated. In addition, the bonding tool is lifted off, the normal force decreases, and the actual temperature drops. As an example, a linear course or that of a decay curve is shown for the decrease in the normal force and the actual temperature. Here as well, these profiles are chosen merely as examples. A different profile oriented to the requirements or specifics of the connection process can be selected.

The operating method according to the first method variant can be easily implemented in terms of process technology and control, because the laser generator is operated synchronously with the ultrasonic generator while the normal force is applied. This variant is also advantageous if the tip of the bonding tool can only be reached or heated by means of the laser when the connection component is pressed against the functional component and the normal force is applied. In addition, the thermal load on the other functional components of the automatic bonding machine is comparatively low, because the tool tip is only heated during contact with the connection component.

Figure 2:
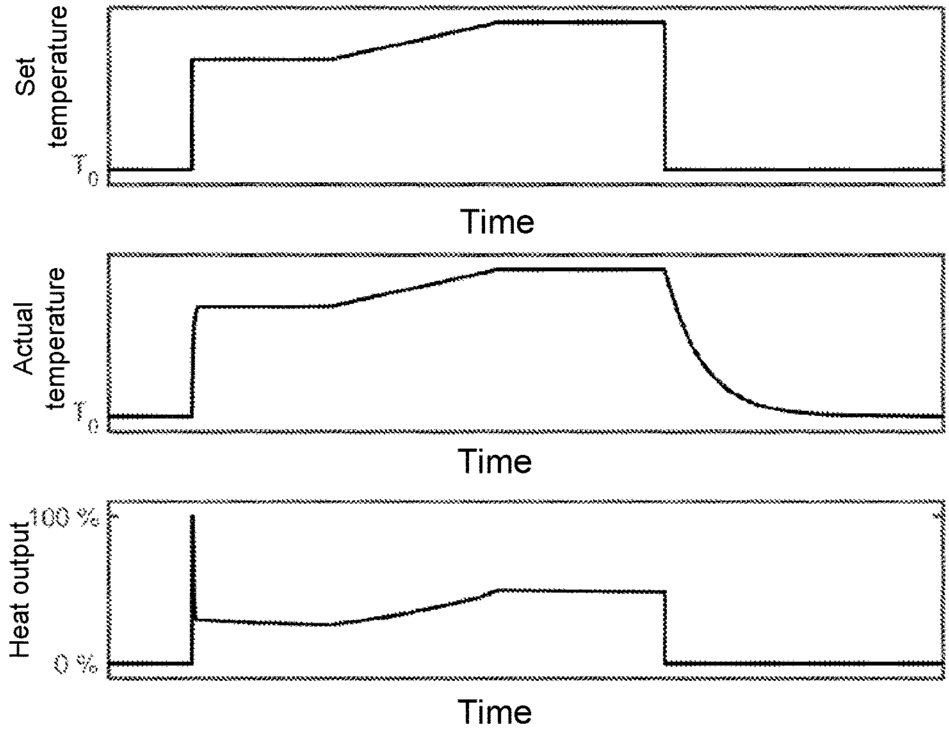
FIG. 2 shows a time comparison of the target temperature, an actual temperature of the tool tip actually determined at the tip of the bonding tool, and a heat output.

The relationship between the target temperature, the actual temperature measured in the region of the tool tip, and the heat output will be discussed below with reference to FIG. 2. In this case, the actual temperature follows the jump to the process value above the ambient or initial temperature $T_0$ as predefined by the target temperature profile. If the target temperature is then kept constant over a certain period of time, the heat output or laser output is reduced in particular because increasingly less heat flows out of the heated bonding tool tip into the rest of the bonding tool.

In order to heat the tip of the bonding tool strongly within a short time, it is necessary to provide a large heat output in pulses and, depending on the optical efficiency or other loss variables, an even greater laser output. The laser output is therefore greater than the heat output by the power loss, or the heat output is the part of the laser output which is provided by the laser and with which the tool tip of the bonding tool is heated.

If, in a further process phase, the target temperature is raised linearly to a higher temperature level as an example, the heat output to be applied increases. As soon as the higher target temperature is reached, the heat output also remains approximately constant again or drops slightly. The actual temperature is determined by measurement in each case. It serves as a control variable for the laser generator.

If the target temperature drops abruptly after the bond is produced, the laser output can also be reduced or the laser generator deactivated. However, the actual temperature will not drop abruptly in case of uncontrolled cooling but will be reduced along a decay curve.

Figure 3:
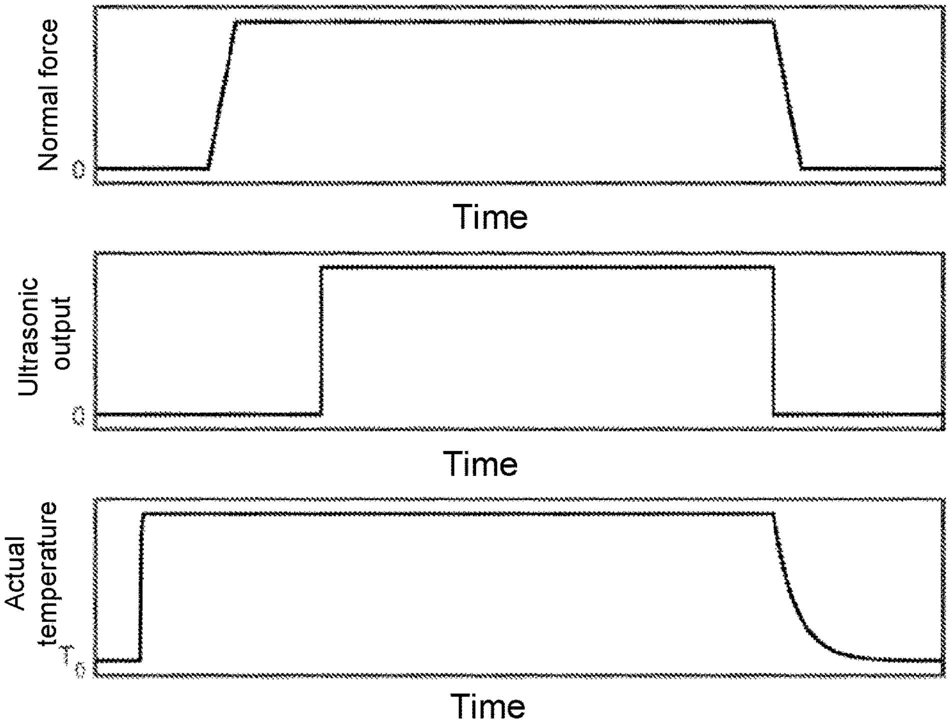
FIG. 3 shows the time profile of the process parameters: normal force, ultrasonic output, and actual temperature of the tip of a bonding tool, in a second variant of the operating method of the invention.

FIG. 3 shows a second process concept in relation to the time profile of the normal force, the ultrasonic output, and the actual temperature. The bonding tool is heated before the normal force is applied. After the normal force is applied, the temperature is maintained with the result that the connection component and the functional component are heated via the tip of the bonding tool.

In this regard, the illustration assumes an ideal controller that ideally compensates for the heat dissipation. In practice, differences may occur that the actual temperature temporarily fluctuates more greatly.

The ultrasound is subsequently activated when the components to be joined have reached an elevated temperature. The temperature is then reduced again after the bonding tool is raised. For example, it can be provided that the bonding tool is heated during positioning of the bonding head. Overall, a significant reduction in process times can be successfully achieved hereby. In addition, wear of the bonding tool can be reduced if the ultrasound is activated only after the bonding partners have been heated and can thus be shaped and bonded more easily.

Figure 4:
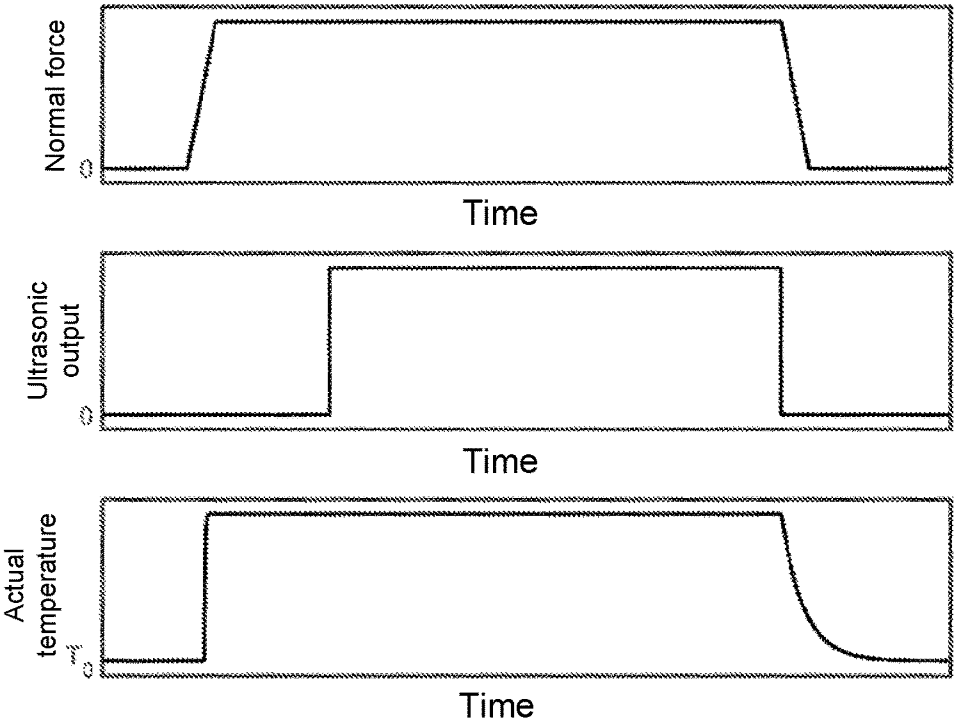
FIG. 4 shows the time profile of the process parameters: normal force, ultrasonic output, and actual temperature of the tip of a bonding tool, in a third variant of the operating method of the invention.
Figure 5:
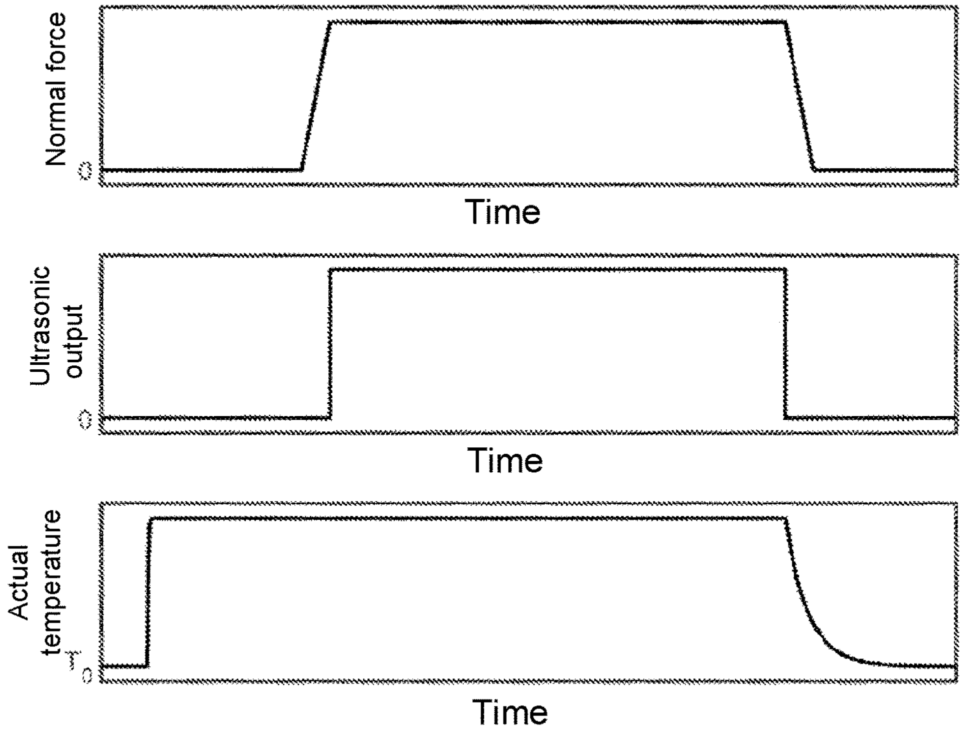
FIG. 5 shows the time profile of the process parameters: normal force, ultrasonic output, and actual temperature of the tip of a bonding tool, in a fourth variant of the operating method of the invention.

Similar process sequences are shown in FIGS. 4 and 5. According to the method example according to FIG. 4, the bonding tool is excited to vibrate ultrasonically after the normal force has been applied and the bonding tool has been heated for a predefined period of time. In this respect, the wear of the bonding tool is reduced here as well. Heating of the bonding tool before applying the normal force is not required here.

In the method variant according to FIG. 5, a further reduction in process time is achieved by providing the normal force and the ultrasonic output essentially simultaneously, whereas the bonding tool is heated to the higher process temperature at an early stage and in particular during the positioning of the bonding head.

Figure 6:
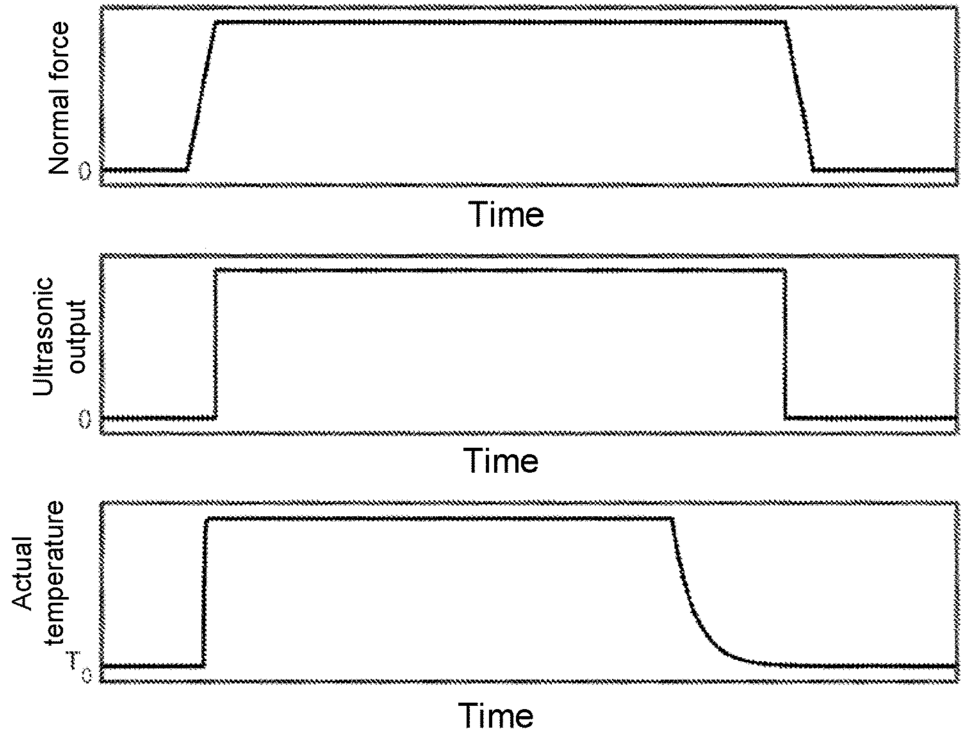
FIG. 6 shows the time profile of the process parameters: normal force, ultrasonic output, and actual temperature of the tip of a bonding tool, in a fifth variant of the operating method of the invention.

According to a fifth method variant as shown in FIG. 6, it is provided to reduce the temperature of the bonding tool before the ultrasonic output is deactivated and the bonding tool is lifted off. This procedure may be indicated in particular to prevent unacceptable heating of the contact surface and/or damage to the functional component. For example, a control measurement or monitoring can be realized with regard to the temperature of the functional component and the laser generator can be deactivated as soon as a critical temperature is reached in the region of the contact surface or the functional component.

Figure 7:
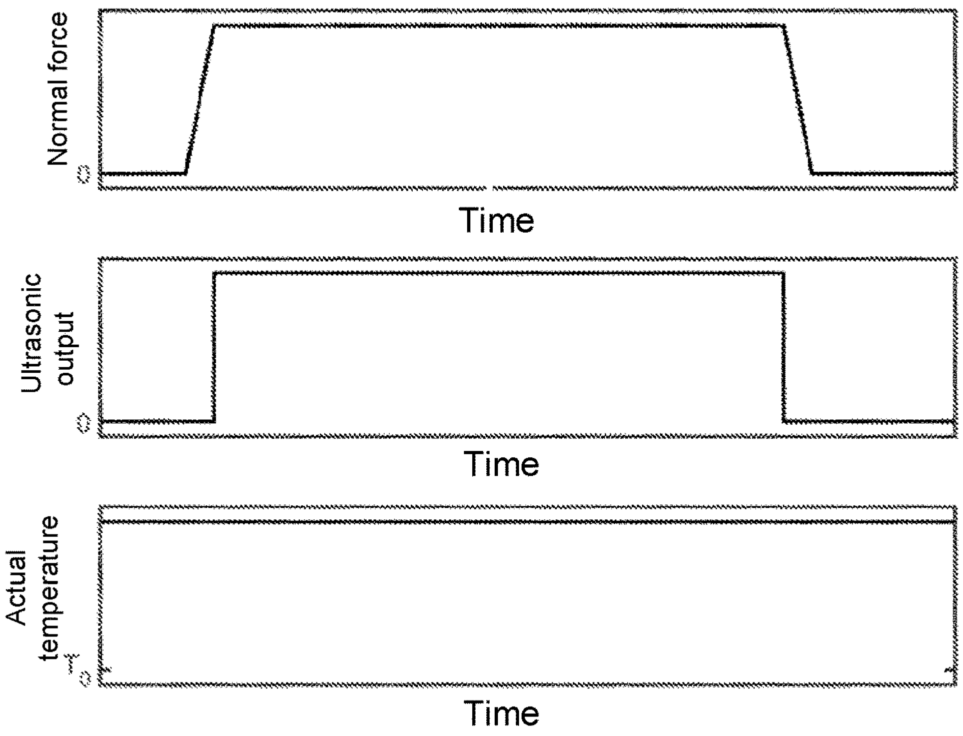
FIG. 7 shows the time profile of the process parameters: normal force, ultrasonic output, and actual temperature of the tip of a bonding tool, in a sixth variant of the operating method of the invention.

According to a sixth embodiment variant of the production process of the invention according to FIG. 7, the actual temperature is maintained at a constant high process value throughout, i.e., over the production of a plurality of electrically conductive connections. In this respect, the connection component in contact with the tip of the bonding tool is heated from the moment of contact with the bonding tool. After the application of the normal force, the heating of the connection component increases due to the intimate contact caused by the normal force, and the functional component also heats up. In addition, the bonding tool is excited to vibrate ultrasonically. Advantageously, the bonding process can be further accelerated by the proposed design of the production process of the invention, because a separately formed heating phase is unnecessary and constant thermal conditions prevail, which have a positive effect on the controllability of the bonding process.

Figure 8:
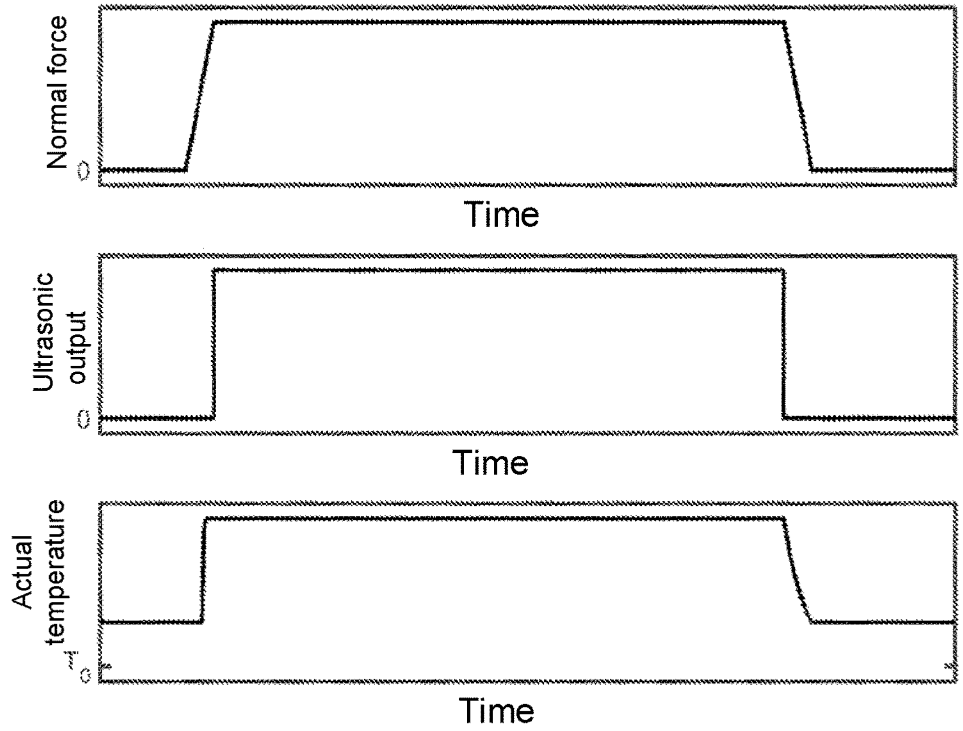
FIG. 8 shows the time profile of the process parameters: normal force, ultrasonic output, and actual temperature of the tip of a bonding tool, in a seventh variant of the operating method of the invention.

A modification of the bonding method discussed above is shown in FIG. 8. In this case, the temperature is always kept above the ambient or initial temperature. Nevertheless, the temperature is raised while the connection is being made.

Advantageously, the process can be accelerated due to the always comparatively high temperature level. In addition, compared to the sixth process variant, the heating energy or the laser energy correlated therewith can be reduced if the actual temperature is allowed to drop between the making of two connections, i.e., for example, when repositioning the bonding head. This reduces the thermal load on the functional components of the automatic bonding machine and the connection component compared to the sixth embodiment variant of the method of the invention according to FIG. 7.

Figure 9:
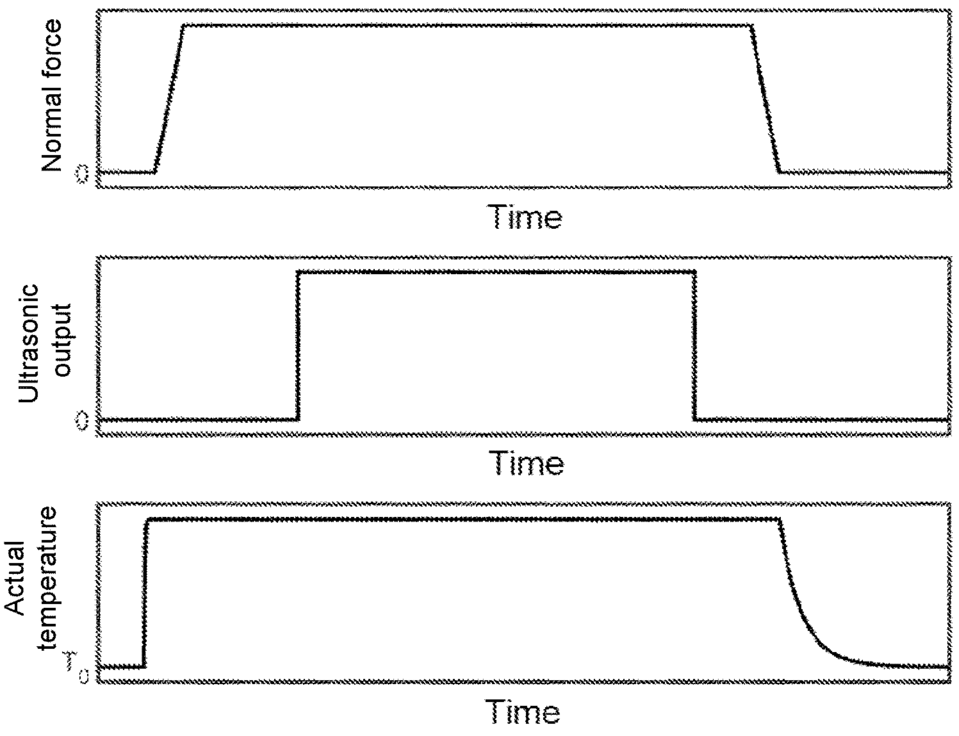
FIG. 9 shows the time profile of the process parameters: normal force, ultrasonic output, and actual temperature of the tip of a bonding tool, in a eighth variant of the operating method of the invention.
Figure 10:
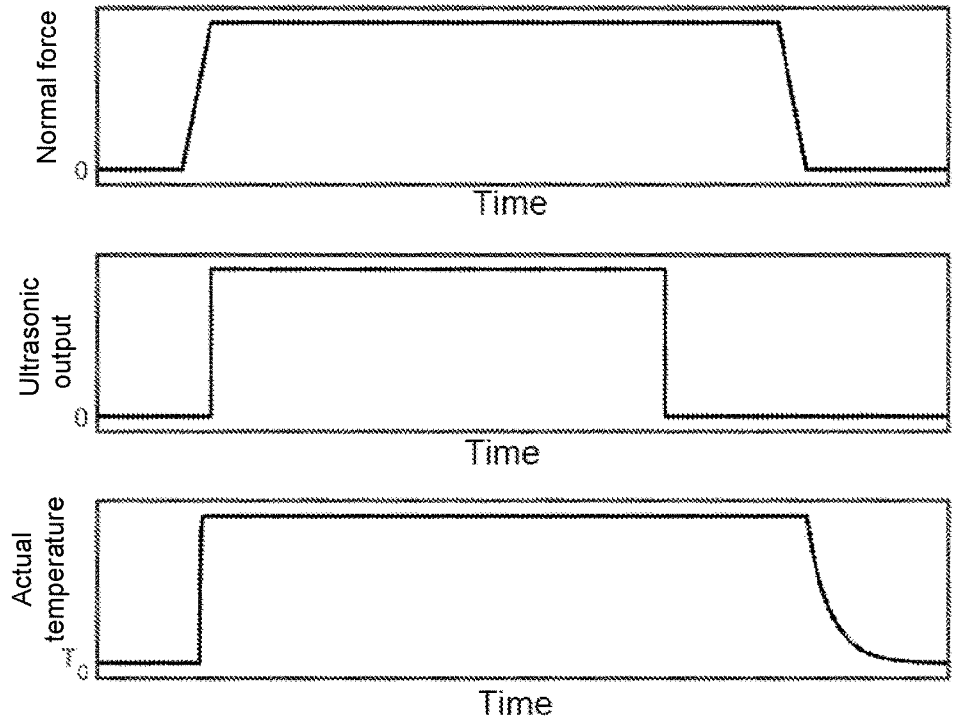
FIG. 10 shows the time profile of the process parameters: normal force, ultrasonic output, and actual temperature of the tip of a bonding tool, in a ninth variant of the operating method of the invention.

According to an eighth method variant according to FIG. 9 and a ninth method variant according to FIG. 10, thermal energy is further introduced into the connection via the laser beam after the ultrasound has already been switched off. The heating is finished only after the bonding tool has been lifted off. The additional, subsequent addition of thermal energy favors the permanent and homogeneous connection of the contact partners.

Figure 11:
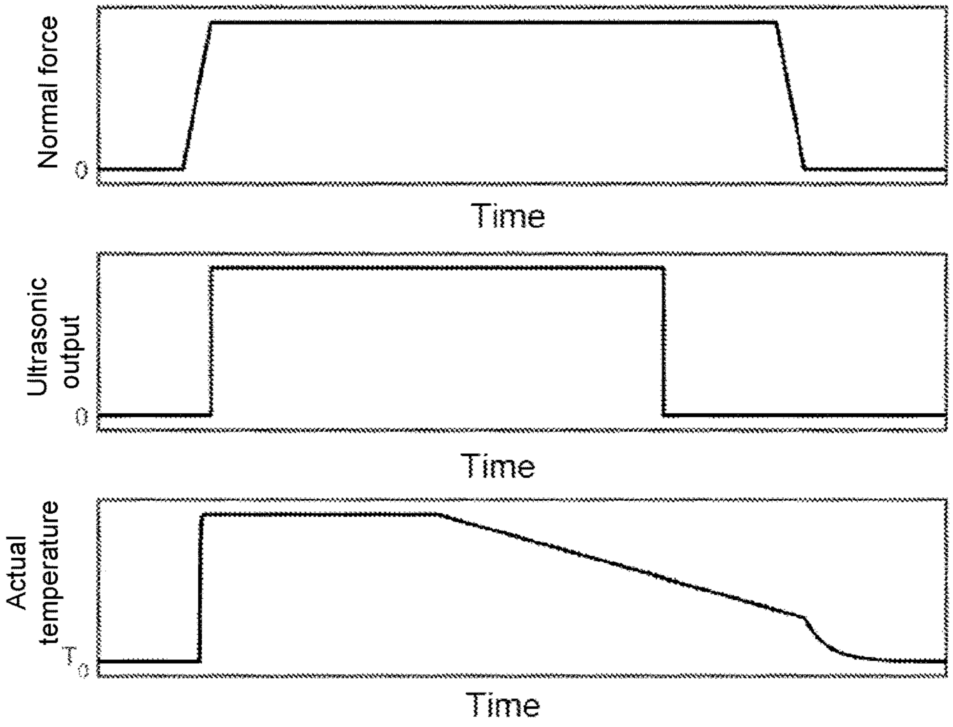
FIG. 11 shows the time profile of the process parameters: normal force, ultrasonic output, and actual temperature of the tip of a bonding tool, in a tenth variant of the operating method of the invention.

FIG. 11 shows an example of a tenth method variant in which the temperature is lowered from a predefined target temperature during the production process. The lowering of the temperature can be provided, for example, in order to avoid unacceptable or damaging heating of the connection component or the functional component.

Figure 12:
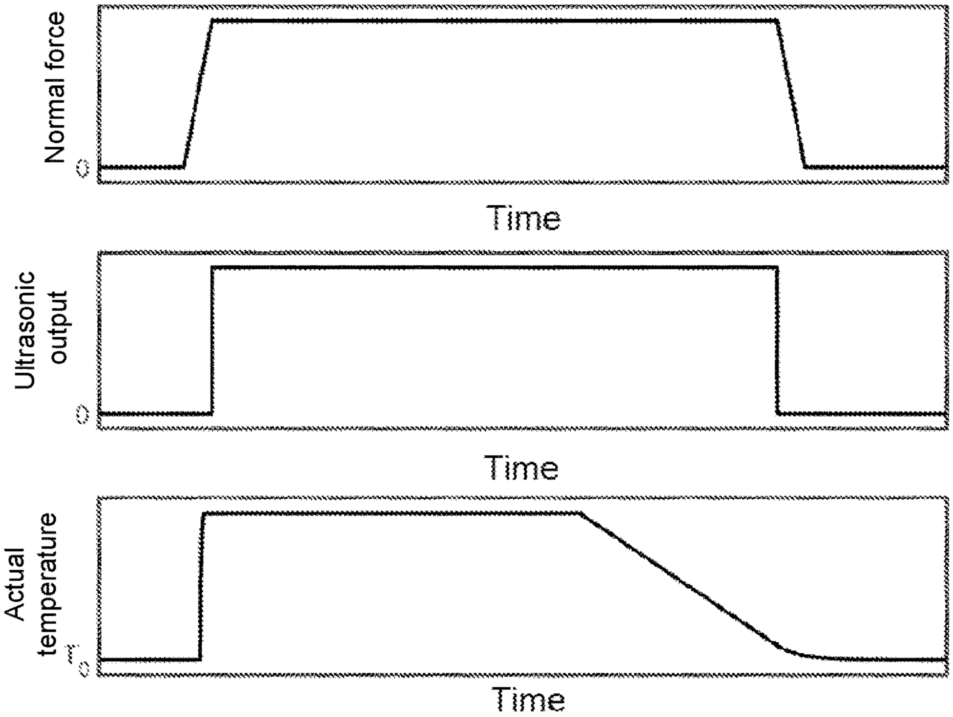
FIG. 12 shows the time profile of the process parameters: normal force, ultrasonic output, and actual temperature of the tip of a bonding tool, in an eleventh variant of the operating method of the invention.
Figure 13:
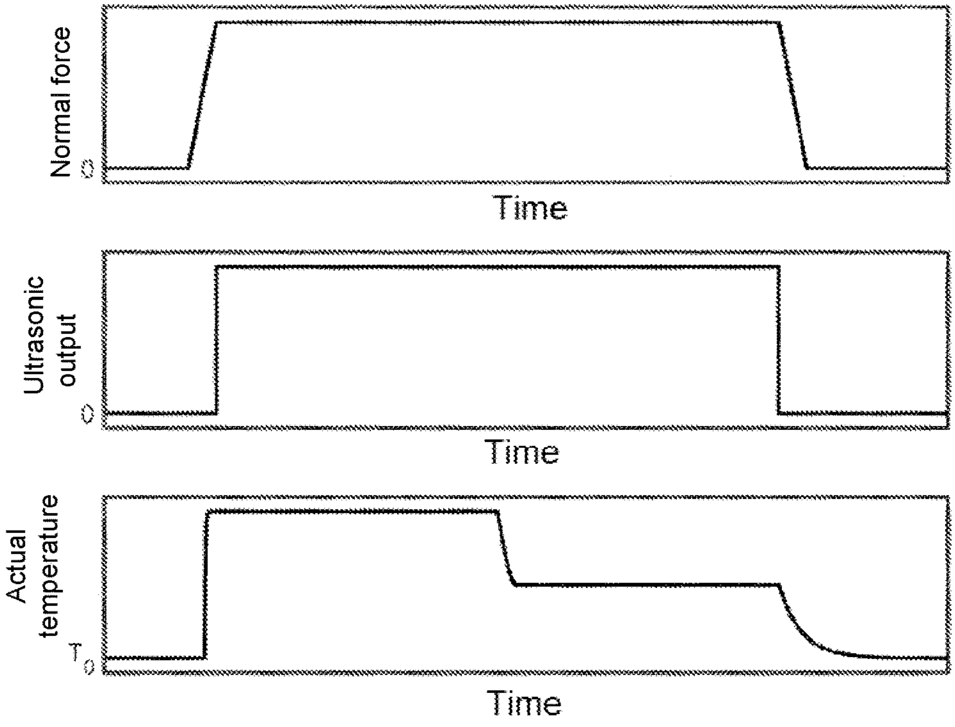
FIG. 13 shows the time profile of the process parameters: normal force, ultrasonic output, and actual temperature of the tip of a bonding tool, in a twelfth variant of the operating method of the invention.

An eleventh method variant according to FIG. 12 and a twelfth method variant according to FIG. 13 show a decreasing profile for the actual temperature during the bonding process. The actual temperature can, for example, be lowered linearly, in steps, or otherwise continuously. In particular, it can also be achieved successfully hereby to prevent damage to the connection component or the functional component. To reduce the actual temperature, the laser generator can be deactivated and/or pulsed and/or operated with a reduced laser output, for example.

Figure 14:
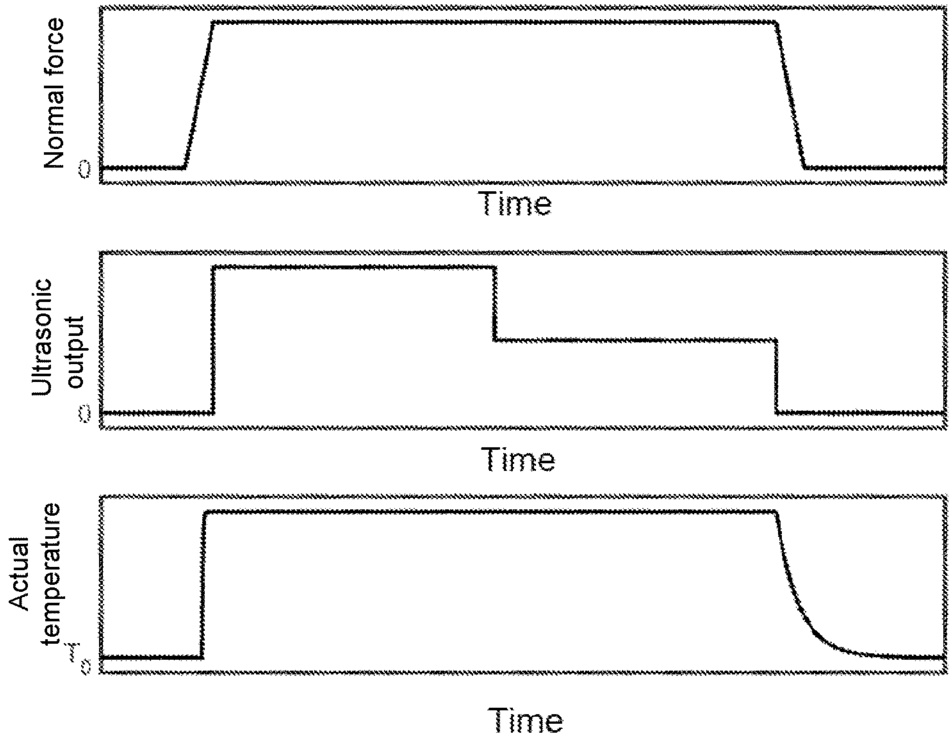
FIG. 14 shows the time profile of the process parameters: normal force, ultrasonic output, and actual temperature of the tip of a bonding tool, in a thirteenth variant of the operating method of the invention.

According to a thirteenth method variant according to FIG. 14, the ultrasonic output is reduced while the connection is made during the ongoing process. As an example, a stepped reduction of the ultrasonic output is shown. For example, it can be provided that the ultrasonic output is not reduced abruptly, but in a ramp-like or continuous manner.

Advantageously, according to the thirteenth method variant of the operating method of the invention, the ultrasonic output can initially be relatively high and can be reduced when the contact surfaces have been cleaned and the first connection has been formed. In this respect, the reduction of the ultrasonic output serves to further develop the already initially formed connection and prevents excessive ultrasonic vibrations from damaging the connection again.

Figure 15:
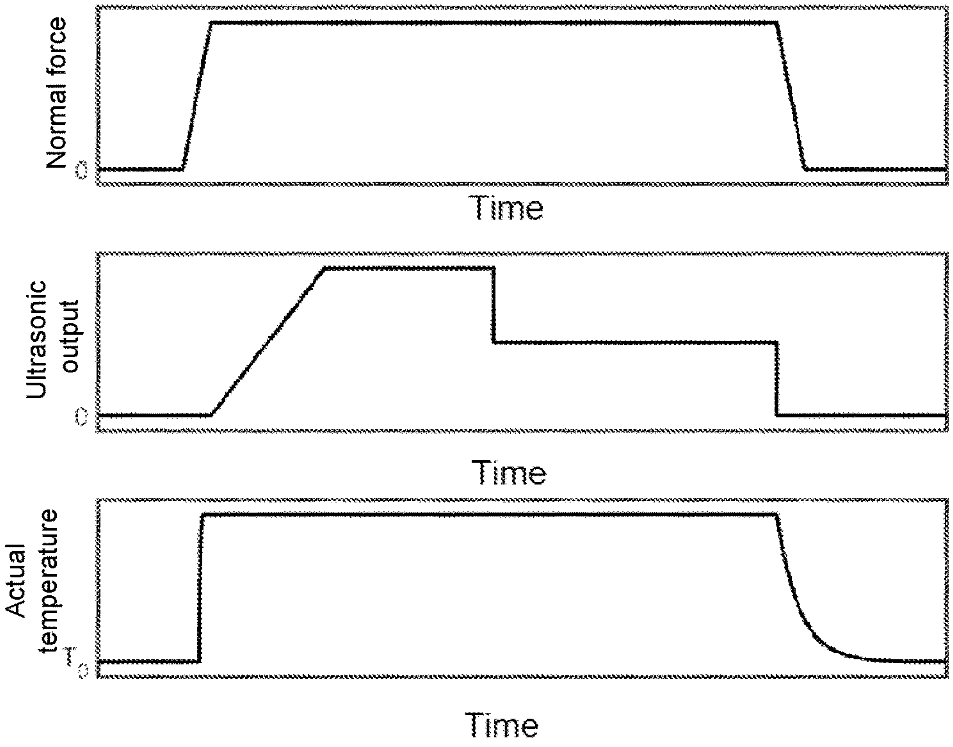
FIG. 15 shows the time profile of the process parameters: normal force, ultrasonic output, and actual temperature of the tip of a bonding tool, in a fourteenth variant of the operating method of the invention.
Figure 16:
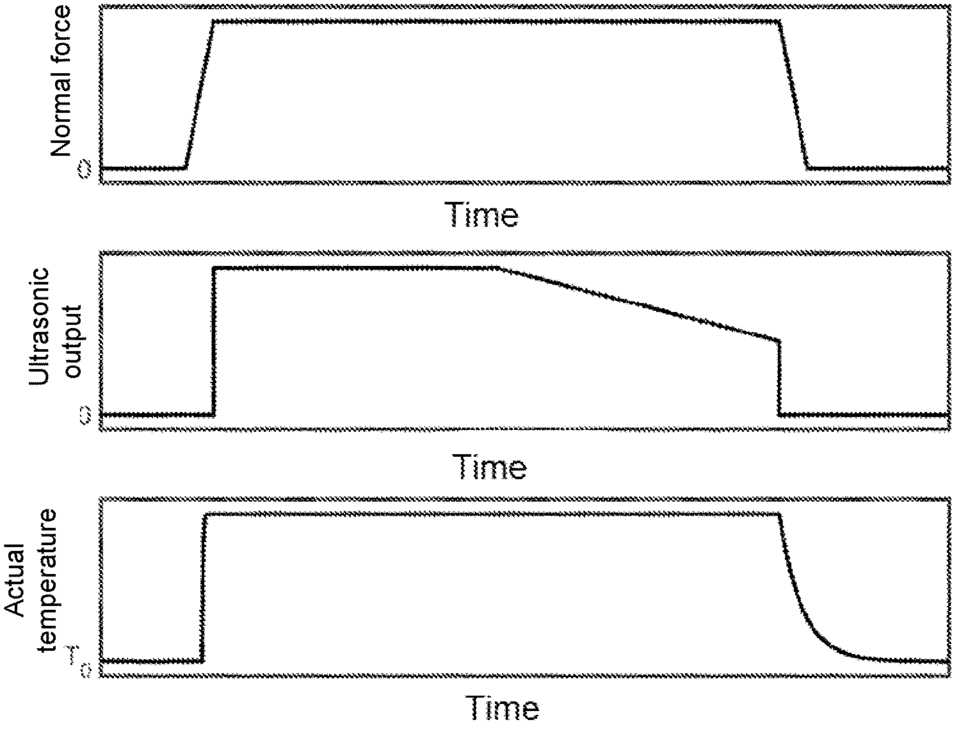
FIG. 16 shows the time profile of the process parameters: normal force, ultrasonic output, and actual temperature of the tip of a bonding tool, in a fifteenth variant of the operating method of the invention.

FIG. 15 shows a modification of the method according to FIG. 14. It is provided here in particular to increase the ultrasonic output slowly and in an exemplary ramp-like manner after the normal force has been applied. In an analogous manner, as shown in FIG. 16, the ultrasonic output can be reduced in a ramp-like or continuous manner.

Advantageously, the (resonance) frequency control of the ultrasonic generator works in a particularly stable manner when the ultrasonic output or the amplitude of the ultrasonic vibration is slowly increased. In addition, during operation of the ultrasonic generator, the electrical voltage is usually predefined. If the vibration amplitude is increased abruptly, overshooting of the current and the ultrasonic output can occur. In that case, the vibration amplitude and the ultrasonic output are temporarily greater than intended and damage can occur, especially to sensitive substrates or functional components.

Figure 17:
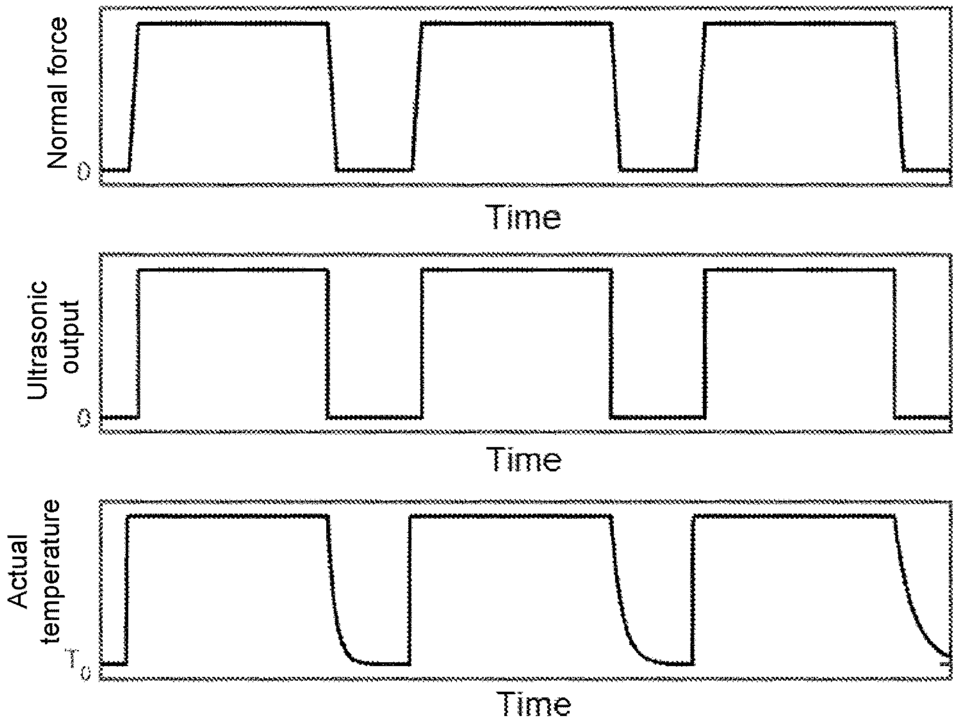
FIG. 17 shows a first exemplary embodiment for the time profile of normal force, ultrasonic output, and actual temperature for three consecutive bonding cycles.
Figure 18:
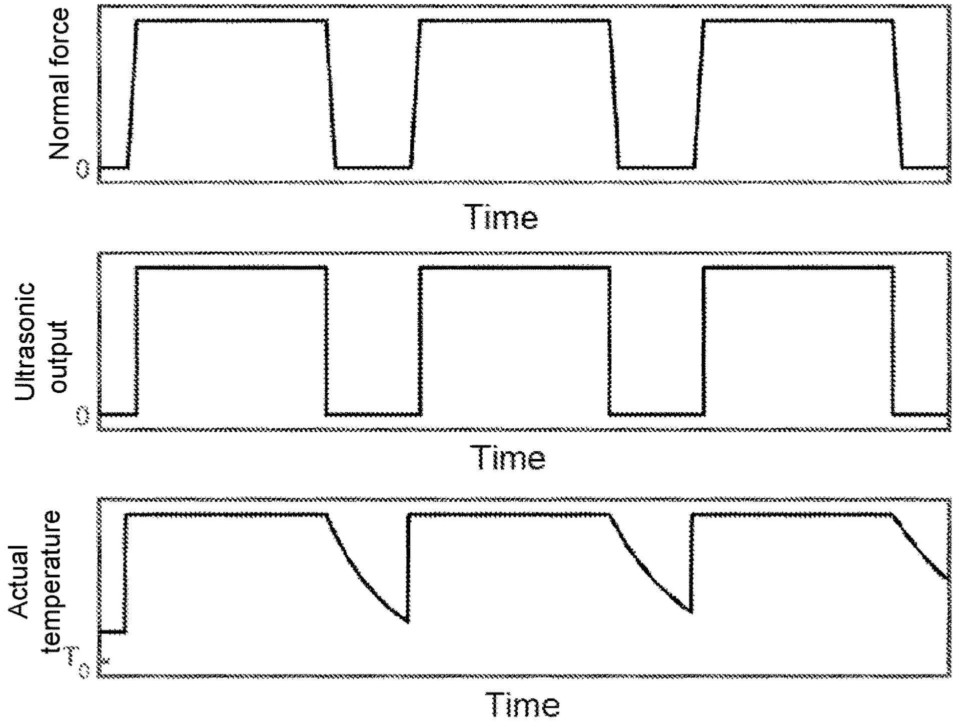
FIG. 18 shows a second exemplary embodiment for the time profile of normal force, ultrasonic output, and actual temperature for three consecutive bonding cycles.

The normal force, ultrasonic output, and actual temperature for three successive bond cycles are now shown in FIGS. 17 and 18, wherein one electrically conductive connection is producing per bond cycle. According to FIG. 17, the bonding process is realized such that the actual temperature is raised to a high first temperature level during bonding and that the actual temperature drops to the initial temperature $T_0$ between two bond cycles. In contrast, according to FIG. 18, the bonding process is designed such that the actual temperature does not drop to the initial temperature $T_0$ between two bonds. For example, the cycle time is so short that the initial temperature $T_0$ cannot be set during free cooling.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A method for producing an electrically conductive connection between a contact surface of a functional component and a connection component, the method comprising:

pressing the connection component against the contact surface of the functional component with a normal force using a bonding tool;

causing the bonding tool and the connection component in contact with the same to vibrate ultrasonically while the normal force is applied;

providing a laser beam using a laser generator;

directing the laser beam onto the bonding tool or onto a tip of the bonding tool;

heating the tip of the bonding tool with the laser beam;

contactlessly measuring an actual temperature of the tip of the bonding tool; and operating the laser generator with an adjustable laser output such that to maintain a predefined target temperature at the tip of the bonding tool during formation of at least two electrically conductive connections and to prevent cooling of the tip between successive operations of the laser generator;

wherein the laser generator is activated to provide the laser beam before the bonding tool is subjected to the normal force and the connecting component is pressed against the contact surface of the functional component and prior to ultrasonic excitation of the bonding tool, wherein the tip of the bonding tool is heated while the bonding tool is positioned at a spaced distance above the contact surface of the functional component, and wherein the laser generator continues to operate after an excitation of the bonding tool to thermally stabilize the formed electrically conductive connection.

2. The method according to claim 1, wherein the laser generator is activated to provide the laser beam before the bonding tool is excited to vibrate ultrasonically.

3. The method according to claim 2, wherein the laser generator is deactivated before the excitation of the bonding tool to vibrate ultrasonically is terminated.

4. The method according to claim 1, wherein a laser output of the laser generator is selected such that the actual temperature of the tip of the bonding tool after a production of a first electrical connection of the at least two electrically conductive connections and before a production of a second electrical connection of the at least two electrically conductive connections is permanently above an ambient and/or initial temperature.

5. The method according to claim 1, wherein the actual temperature is controlled with the target temperature as a reference variable.

6. The method according to claim 1, wherein the actual temperature of the tip of the bonding tool is reduced from a high first temperature level to a lower second temperature level during the production of the connection by at least temporarily deactivating the laser generator and/or reducing the laser output of the laser generator and/or a pulsed operation of the laser generator.

7. The method according to claim 1, wherein the actual temperature of the tip of the bonding tool is determined continuously and/or repeatedly at fixed or variable time intervals.

8. The method according to claim 1, wherein the target temperature changes over time.

9. The method according to claim 1, wherein the laser beam is guided out of the laser generator via an optical waveguide and is guided to the tip of the bonding tool.

10. The method according to claim 1, wherein a free optical waveguide end, facing the tip of the bonding tool, is positioned and/or held at a distance from the bonding tool.

11. The method according to claim 1, wherein the laser beam strikes the bonding tool from an outside on the lateral surface.

12. The method according to claim 1 further comprising continuously maintaining the actual temperature over at least two electrically conductive connections.

13. The method according to claim 1, wherein the laser generator is operated intermittently to maintain the predefined target temperature at the tip of the bonding tool.

* * * * *